US011899385B2

United States Patent
Usami

(10) Patent No.: US 11,899,385 B2
(45) Date of Patent: Feb. 13, 2024

(54) TEMPERATURE CONTROL DEVICE FOR INDUCTIVE HEATER

(71) Applicant: TOSHIBA TEC KABUSHIKI KAISHA, Tokyo (JP)

(72) Inventor: Yutaka Usami, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/943,102

(22) Filed: Sep. 12, 2022

(65) Prior Publication Data

US 2023/0081082 A1 Mar. 16, 2023

(30) Foreign Application Priority Data

Sep. 14, 2021 (JP) ................................ 2021-149375
Nov. 2, 2021 (JP) ................................ 2021-179736

(51) Int. Cl.
*G03G 15/20* (2006.01)
*G03G 15/00* (2006.01)
*H05B 6/06* (2006.01)

(52) U.S. Cl.
CPC ..... *G03G 15/2039* (2013.01); *G03G 15/2053* (2013.01); *G03G 15/2064* (2013.01); *G03G 15/5004* (2013.01); *G03G 15/5045* (2013.01); *H05B 6/06* (2013.01); *G03G 2215/2006* (2013.01)

(58) Field of Classification Search
USPC .......................................................... 399/329
See application file for complete search history.

(56) References Cited

U.S. PATENT DOCUMENTS 9,921,530 B2 3/2018 Gon
11,003,117 B1 * 5/2021 Ota .................... G03G 15/2039
2017/0299990 A1 * 10/2017 Gon ....................... G03G 15/80

FOREIGN PATENT DOCUMENTS

JP 2014119653 A 6/2014
JP 2015222378 A 12/2015
JP 2017194501 A 10/2017

* cited by examiner

*Primary Examiner* — Quana Grainger
(74) *Attorney, Agent, or Firm* — Kim & Stewart LLP

(57) ABSTRACT

According to one embodiment, a temperature control device includes a temperature estimation unit and a frequency generation unit. The temperature estimation unit is configured to estimate a temperature of an object being heated by an induction heating coil, the temperature being estimated based on a frequency of a drive signal supplied to an inverter connected to the induction heating coil. The frequency generation unit is configured to set the frequency of the drive signal based on the temperature estimated by the temperature estimation unit, a detected temperature of the object from a temperature sensor, and a target temperature for the object.

16 Claims, 7 Drawing Sheets

TEMPERATURE CONTROL DEVICE FOR INDUCTIVE HEATER

CROSS-REFERENCE TO RELATED APPLICATIONS

This application is based upon and claims the benefit of priority from Japanese Patent Application No. 2021-149375, filed Sep. 14, 2021, and Japanese Patent Application No. 2021-179736, filed on Nov. 2, 2021, the entire contents of each of which are incorporated herein by reference.

FIELD

Embodiments described herein relate to a temperature control device.

BACKGROUND

An image forming apparatus includes a fuser that fixes a toner image onto a print medium by applying heat and pressure. For example, the fuser is an induction heating (IH) type fuser. The induction heating type fuser includes an induction heating coil, a fixing belt, a pressure roller, a temperature sensor, and the like. The temperature sensor detects the surface temperature of the fixing belt. A fuser may also be referred to as a fixing device or the like.

A controller of the fuser controls heating based on a detection signal (temperature sensor signal) from a temperature sensor such that a surface temperature of a fixing belt will be at a target value.

If there is a deviation (or time lag) between the temperature as detected (reported) by the temperature sensor and the actual surface temperature of the fixing belt, overshoot, temperature ripple, and the like may occur. Therefore, in order to prevent the occurrence of overshoot and temperature ripple, a temperature sensor with good responsiveness (for example, thermopile or the like) is typically required. However, there is a problem that a temperature sensor with good responsiveness is usually expensive.

DETAILED DESCRIPTION

An embodiment provides a temperature control device for preventing the occurrence of overshoot and temperature ripple at low cost.

In general, according to one embodiment, a temperature control device includes a temperature estimation unit and a frequency generation unit. The temperature estimation unit is configured to estimate a temperature of an object being heated by an induction heating coil, the temperature being estimated based on a frequency of a drive signal supplied to an inverter connected to the induction heating coil. The frequency generation unit is configured to set the frequency of the drive signal based on the temperature estimated by the temperature estimation unit, a detected temperature of the object from a temperature sensor, and a target temperature for the object.

Figure 1:
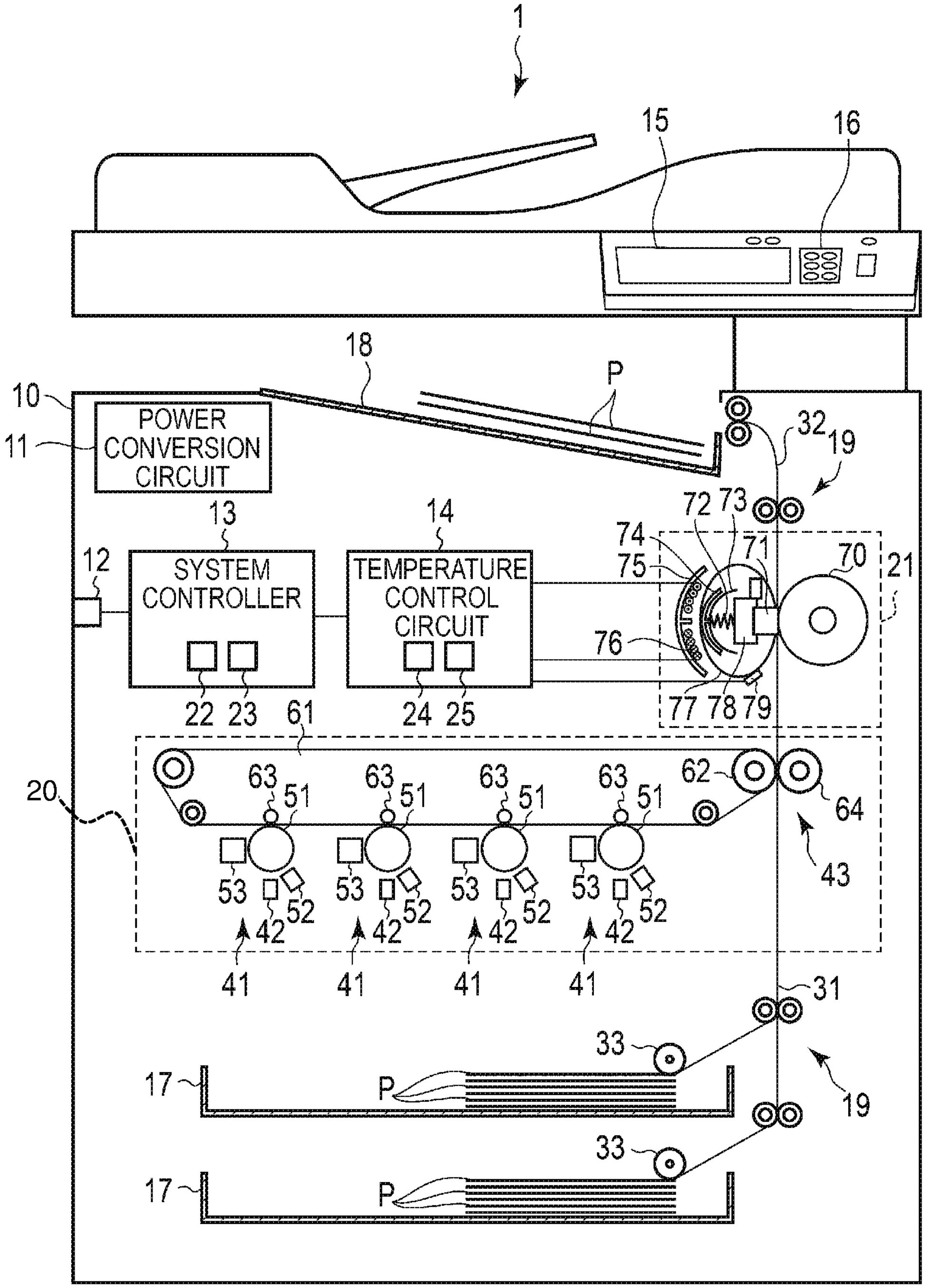
FIG. 1 is a diagram of an image forming apparatus according to one embodiment.

Hereinafter, a temperature control device according to certain example embodiments will be described with reference to the drawings. FIG. 1 shows an example configuration of an image forming apparatus 1 according to an embodiment. The image forming apparatus 1 is one example of a temperature control device.

For example, the image forming apparatus 1 is a multi-function peripheral (MFP) that performs various processes such as image forming (printing) or the like on a conveyed print medium P. For example, the image forming apparatus 1 is a solid-state scanning printer (for example, an LED printer) that scans a light emitting diode (LED) array that performs various processes such as image forming or the like, while conveying a print medium P.

For example, the image forming apparatus 1 includes a configuration that receives toner from a toner cartridge and forms an image on the print medium with the received toner. The toner may be a monochromatic toner, or may be a color toner having a color such as cyan, magenta, yellow, black, or the like, for example. Further, the toner may be a decolorable toner that decolorizes if heat is applied.

As illustrated in FIG. 1, the image forming apparatus 1 includes a housing 10, a power conversion circuit 11, a communication interface 12, a system controller 13, a temperature control circuit 14, a display unit 15, an operation interface 16, a plurality of paper trays 17, a paper discharge tray 18, a conveyance unit 19, an image forming unit 20, and a fuser 21.

The housing 10 is the main body of the image forming apparatus 1. The housing 10 houses the power conversion circuit 11, the communication interface 12, the system controller 13, the temperature control circuit 14, the display unit 15, the operation interface 16, the plurality of paper trays 17, the paper discharge tray 18, the conveyance unit 19, the image forming unit 20, and the fuser 21.

First, the configuration of a control system of the image forming apparatus 1 will be described.

The power conversion circuit 11 uses AC voltage from an AC power supply that supplies power to the image forming apparatus 1 to supply DC voltage to various components in the image forming apparatus 1.

The communication interface 12 is for communicating with other devices. For example, the communication interface 12 is used for communication with a higher-level device (an external device). For example, the communication interface 12 is a Local Area Network (LAN) connector or the like. Further, the communication interface 12 may perform wireless communication with other devices in accordance with a standard such as Bluetooth®, Wi-Fi®, or the like.

The system controller 13 controls the image forming apparatus 1. For example, the system controller 13 includes a processor 22 and a memory 23.

The processor 22 is an arithmetic element that executes arithmetic processes. For example, the processor 22 is a central processing unit (CPU). The processor 22 performs various processes based on programs, data, and the like stored in the memory 23. The processor 22 serves as a control unit capable of executing various operations by executing a program stored in the memory 23.

The processor 22 executes the program stored in the memory 23 to perform various information processing functions or operations. For example, the processor 22 generates a print job based on an image acquired from an external device via the communication interface 12. The processor 22 stores the generated print job in the memory 23.

The print job includes image data indicating an image to be formed on the print medium P. The image data may be data for forming an image on one print medium P, or may be data for forming an image on a plurality of print media P. In addition, the print job includes information indicating whether it is a color print job or a monochrome print job. The print job may include information such as the number of copies to be printed (the number of page sets), the number of prints per copy (the number of pages), and the like.

Further, the processor 22 generates print control information for controlling the operations of the conveyance unit 19, the image forming unit 20, and the fuser 21 based on the generated print job. The print control information includes information indicating the timing of paper to be printed. The processor 22 supplies the print control information to the temperature control circuit 14.

Further, the processor 22 serves as a print engine controller (engine controller) that executes a program stored in the memory 23 to control the operations of the conveyance unit 19 and the image forming unit 20. That is, the processor 22 controls the conveyance of the print medium P by the conveyance unit 19 and controls the formation of an image on the print medium P by the image forming unit 20, and the like.

The memory 23 is a storage medium for storing programs, data used in the programs, and the like. In addition, the memory 23 also serves as a working memory. That is, the memory 23 temporarily stores the data being processed by the processor 22, the program executed by the processor 22, and the like.

The image forming apparatus 1 in other examples may be configured to include an engine controller separately from the system controller 13. In this case, the engine controller controls the conveyance of the print medium P by the conveyance unit 19 and controls the formation of an image on the print medium P by the image forming unit 20, and the like. Furthermore, in this case, the system controller 13 supplies the engine controller with information necessary for control of a print operation.

The temperature control circuit 14 controls the temperature of the fuser 21. For example, the temperature control circuit 14 includes a processor 24 and a memory 25. Like the processor 22, the processor 24 is an arithmetic element that executes arithmetic processes. The processor 24 performs various processes based on programs, data, and the like stored in the memory 25. The processor 24 executes programs stored in the memory 25 to execute various operations and functions. Like the memory 23, the memory 25 is a storage medium for storing programs, data used in the programs, and the like.

The display unit 15 includes a display that displays a screen according to a video signal input from a display control unit such as the system controller 13, a graphic controller, or the like. For example, the display of the display unit 15 displays screens for various settings of the image forming apparatus 1.

The operation interface 16 is connected to an input operation member. The operation interface 16 supplies operation signals to the system controller 13 corresponding to user operations made using the input operation member(s). For example, an input operation member can be a touch sensor, a numeric keypad, a power key, a paper feed key, various function keys, a keyboard, or the like. The touch sensor acquires information indicating a designated position in a certain area of a display screen or the like. The touch sensor can be configured integrally with the display unit 15 as a touch panel, and thus inputs a signal indicating a touched position on the screen displayed on the display unit 15 to the system controller 13.

Each of the paper trays 17 is a cassette that houses print media P. The paper tray 17 is configured to be inserted into and removed from the housing 10 to permit loading and unloading of print media P.

The paper discharge tray 18 supports a print medium P discharged from the image forming apparatus 1.

Next, a configuration for conveying the print medium P of the image forming apparatus 1 will be described.

The conveyance unit 19 is a mechanism for conveying the print medium P within the image forming apparatus 1. As illustrated in FIG. 1, the conveyance unit 19 provides a plurality of conveyance paths. For example, the conveyance unit 19 includes a paper feed conveyance path 31 and a paper discharge conveyance path 32.

The paper feed conveyance path 31 and the paper discharge conveyance path 32 are each formed of motors, rollers, and guides. The motors rotate shafts under the control of the system controller 13 to rotate the rollers linked to the shafts. As the rollers are rotated, the print medium P is moved along a conveyance path. The guides serve to limit the conveyance direction of the print medium P on a conveyance path.

The paper feed conveyance path 31 picks up a print medium P from the paper tray 17, and then supplies the picked up print medium P to the image forming unit 20. The paper feed conveyance path 31 includes a pickup roller 33 corresponding to each paper tray. Each pickup roller 33 can send a print medium P on a paper tray 17 into the paper feed conveyance path 31.

The paper discharge conveyance path 32 is a conveyance path for discharging the print medium P from the housing 10 after printing. The print medium P discharged by the paper discharge conveyance path 32 can be supported on the paper discharge tray 18.

The image forming unit 20 is configured to form an image on the print medium P. Specifically, the image forming unit 20 forms an image on the print medium P based on a print job generated by the processor 22.

The image forming unit 20 includes a plurality of process units 41, a plurality of exposure devices 42, and a transfer mechanism 43. The image forming unit 20 includes the exposure device 42 for each process unit 41. One process unit 41 and one exposure device 42 will be described as representative of the plurality of process units 41 and the plurality of exposure devices 42.

The process unit 41 is configured to form a toner image. For example, a separate process unit 41 is provided for each type of toner. For example, one of the process units 41 corresponds to each of the colors of toner such as cyan, magenta, yellow, black, and the like, respectively. Specifically, a toner cartridge for one color of toner can be connected to each process unit 41.

The toner cartridge includes a toner container and a toner delivery mechanism. The toner container is a container that stores toner therein. The toner delivery mechanism is a mechanism formed of a screw or the like that delivers toner from the toner container to the process unit 41.

Each process unit 41 includes a photosensitive drum 51, an electrostatic charger 52, and a developing device 53.

The photosensitive drum 51 is a cylindrical drum with a photosensitive layer formed on an outer peripheral surface of the drum. The photosensitive drum 51 can be rotated at a constant speed by a drive mechanism.

The electrostatic charger 52 uniformly charges the surface of the photosensitive drum 51. For example, the electrostatic charger 52 applies a voltage (development bias voltage) to the photosensitive drum 51 using an electrostatic roller to charge the photosensitive drum 51 to a uniform negative electrode potential (contrast potential). The electrostatic roller is rotated by the rotation of the photosensitive drum 51 with a predetermined pressure being applied to the photosensitive drum 51.

The developing device 53 is a device for adhering the toner onto the photosensitive drum 51. The developing device 53 includes a developer container, an agitating mechanism, a developing roller, a doctor blade, an auto toner control (ATC) sensor, and the like.

The developer container is a container that receives and stores the toner delivered from the toner cartridge. A carrier is stored in the developer container in advance. The toner delivered from the toner cartridge is agitated (mixed) with the carrier by the agitating mechanism to form a developer in which the toner and the carrier are mixed. In general, the carrier is placed in the developer container when the developing device 53 is manufactured and is not replenished (replaced) over time, but rather is used over and over (recycled).

The developing roller is rotated in the developer container to attach the developer onto the roller surface. The doctor blade is a member arranged at a predetermined interval from the surface of the developing roller. The doctor blade removes a portion of the developer adhered onto the surface of the rotating developing roller. As a result, a developer layer having a thickness corresponding to the distance between the doctor blade and the surface of the developing roller is formed on the surface of the developing roller.

For example, an ATC sensor is a magnetic flux sensor that has a coil and detects a voltage value generated in the coil. The detected voltage of the ATC sensor changes according to the density of the magnetic flux from the toner in the developer container. That is, the system controller 13 determines the concentration ratio (toner concentration ratio) of the toner to the carrier still remaining in the developer container based on the detected voltage of the ATC sensor. The system controller 13 operates a motor to drive a toner cartridge delivery mechanism based on the detected toner concentration ratio to deliver additional toner from the toner cartridge to the developer container of the developing device 53 if the toner concentration ratio is low.

The exposure device 42 includes a plurality of light emitting elements. The exposure device 42 selectively irradiates the charged photosensitive drum 51 with light from the light emitting elements to form a latent image on the photosensitive drum 51. For example, the light emitting elements are light emitting diodes (LEDs) or the like. One light emitting element is configured to irradiate one point on the photosensitive drum 51 with light. The plurality of light emitting elements are arranged in a main scanning direction which is a direction parallel to the rotation axis of the photosensitive drum 51.

The exposure device 42 irradiates the photosensitive drum 51 with light with the plurality of light emitting elements arranged in the main scanning direction to form a latent image on the photosensitive drum 51 for one line. The exposure device 42 continuously irradiates the rotating photosensitive drum 51 with light to form a plurality of lines of the latent images line-by-line.

When the electrostatically charged surface of the photosensitive drum 51 is irradiated with the light from the exposure device 42, an electrostatic latent image can be formed since exposure changes the conductivity of the photosensitive layer of the photosensitive drum 51. When the layer of the developer formed on the surface of the developing roller approaches the surface of the photosensitive drum 51, the toner contained in the developer is selectively adhered onto the surface of the photosensitive drum 51 in a manner corresponding to the latent image. As a result, a toner image is formed on the surface of the photosensitive drum 51.

The transfer mechanism 43 is configured to transfer the toner image formed on the surface of the photosensitive drum 51 to the print medium P.

For example, the transfer mechanism 43 includes a primary transfer belt 61, a secondary transfer facing roller 62, a plurality of primary transfer rollers 63, and a secondary transfer roller 64.

The primary transfer belt 61 is an endless belt wound around the secondary transfer facing roller 62 and a plurality of winding rollers. An inner surface (inner peripheral surface) of the primary transfer belt 61 is in contact with the secondary transfer facing roller 62 and the plurality of winding rollers, and an outer surface (outer peripheral surface) faces the photosensitive drum 51 of the process unit 41.

The secondary transfer facing roller 62 is rotated by a motor. The secondary transfer facing roller 62 rotates to convey the primary transfer belt 61 in a predetermined conveyance direction. The plurality of winding rollers are configured to be freely rotatable. The plurality of winding rollers are rotated according to the movement of the primary transfer belt 61 by the secondary transfer facing roller 62.

The plurality of primary transfer rollers 63 are configured to bring the primary transfer belt 61 into contact with the photosensitive drum 51 of the process unit 41. The plurality of primary transfer rollers 63 are provided so as to correspond to the photosensitive drums 51 of the plurality of process units 41. Specifically, the plurality of primary transfer rollers 63 are provided at positions facing each other with the photosensitive drum 51 of the corresponding process unit 41 with the primary transfer belt 61 interposed therebetween. The primary transfer roller 63 comes into contact with the inner peripheral surface side of the primary transfer belt 61 and displaces the primary transfer belt 61 toward the photosensitive drum 51. As a result, the primary transfer roller 63 brings the outer peripheral surface of the primary transfer belt 61 into contact with the photosensitive drum 51.

The secondary transfer roller 64 is provided at a position facing the primary transfer belt 61. The secondary transfer roller 64 contacts the outer peripheral surface of the primary transfer belt 61 and applies pressure thereto. As a result, a transfer nip is formed at which the secondary transfer roller 64 and the outer peripheral surface of the primary transfer belt 61 are in close contact with each other. When the print medium P passes through the transfer nip, the secondary transfer roller 64 presses the print medium P passing through the transfer nip against the outer peripheral surface of the primary transfer belt 61.

The secondary transfer roller 64 and the secondary transfer facing roller 62 are rotated to convey the print medium P supplied from the paper feed conveyance path 31 while holding the print medium P therebetween. As a result, the print medium P passes through the transfer nip.

In the above configuration, when the outer peripheral surface of the primary transfer belt 61 comes into contact with the photosensitive drum 51, the toner image formed on the surface of the photosensitive drum is transferred onto the outer peripheral surface of the primary transfer belt 61. If the image forming unit 20 includes the plurality of process units 41, the primary transfer belt 61 receives the toner images from each of the photosensitive drums 51 of the plurality of process units 41. The toner image transferred onto the outer peripheral surface of the primary transfer belt 61 is conveyed by the primary transfer belt 61 to the transfer nip where the secondary transfer roller 64 and the outer peripheral surface of the primary transfer belt 61 are in close contact with each other. If the print medium P is in the transfer nip, the toner image on the outer peripheral surface of the primary transfer belt 61 is transferred onto the print medium P in the transfer nip.

Next, a configuration related to fixing of the image forming apparatus 1 will be described.

The fuser 21 is an induction heating type fuser that fixes the toner image onto the print medium P. The fuser 21 is operated under the control of the system controller 13 or the temperature control circuit 14.

The fuser 21 includes a pressure roller 70, a pressure pad 71, a magnetic alloy shunt position adjustment mechanism 72 ("shunt adjuster 72"), an aluminum member 73, a magnetic alloy shunt 74, a ferrite core 75, an induction heating coil 76, a fixing belt 77, a frame 78, and a temperature sensor 79.

The pressure roller 70 is positioned so as to face the fixing belt 77 from a radial direction. The width of the pressure roller 70 in the longitudinal direction is greater than the width of the print medium P to be conveyed. The longitudinal direction of the pressure roller 70 is a direction orthogonal to the rotation direction of the pressure roller 70. The pressure roller 70 comes into contact with the fixing belt 77 by the pressure of springs at both ends. The pressure roller 70 includes a metal member, as a core material, and an elastic layer, such as a rubber layer or the like, on the outside thereof. The pressure roller 70 includes a release layer on the outside surface. The pressure roller 70 is rotationally driven. The rotation of the pressure roller 70 may drive the fixing belt 77. The pressure roller 70 may include a one-way clutch such that a speed difference from the fixing belt 77 does not occur.

The pressure pad 71 is positioned inside the fixing belt 77. The pressure pad 71 presses against the fixing belt 77 toward the pressure roller 70. A fixing nip is formed between the fixing belt 77 and the pressure roller 70. The shape of the portion of the pressure pad 71 facing the pressure roller 70 is substantially the same as the outer peripheral shape of the pressure roller 70. The width of the pressure pad 71 in the longitudinal direction is greater than the width of the print medium P to be conveyed. The longitudinal direction of the pressure pad 71 is a direction parallel to the longitudinal direction of the fixing belt 77 corresponding to the direction orthogonal to the rotation direction of the fixing belt 77. The pressure pad 71 has a low friction material between itself and the pressure roller 70 in order to improve the slidability (reduce friction). The pressure pad 71 is made of a heat resistant resin material. For example, the heat-resistant resin is polyetheretherketone (PEEK), phenol resin, or the like.

The shunt adjuster 72 is fixed to the frame 78. The shunt adjuster 72 is a position adjustment mechanism for the magnetic alloy shunt 74. The shunt adjuster 72 includes a spring. The shunt adjuster 72 adjusts the position of the magnetic alloy shunt 74 by the force of the spring.

The aluminum member 73 is connected to the shunt adjuster 72. The aluminum member 73 blocks the magnetic field generated by the induction heating coil 76.

The magnetic alloy shunt 74 faces the induction heating coil 76 with a portion of the fixing belt 77 interposed therebetween. For example, the width of the magnetic alloy shunt 74 in the longitudinal direction is greater than the width of the fixing belt 77 in the longitudinal direction. The longitudinal direction of the magnetic alloy shunt 74 is a direction parallel to the longitudinal direction of the fixing belt 77. The magnetic alloy shunt 74 is a sheet material made of a temperature-sensitive magnetic material. The inductance value of the magnetic alloy shunt 74 is substantially constant at less than a saturation temperature, but drops sharply at the saturation temperature or higher.

The ferrite core 75 is positioned outside the induction heating coil 76. The ferrite core 75 blocks the magnetic field generated by the induction heating coil 76.

The induction heating coil 76 is positioned on the outside of the fixing belt 77. The induction heating coil 76 forms a magnetic field by the supply of power from an inverter 82. The power supplied to the induction heating coil 76 is also referred to as IH power. The induction heating coil 76 is an example of an element related to temperature control.

The fixing belt 77 is an endless belt. The fixing belt 77 is rotated counterclockwise in FIG. 1. The width of the fixing belt 77 in the longitudinal direction is greater than the width of the print medium P to be conveyed. The fixing belt 77 includes a plurality of layers. The fixing belt 77 includes a conductive layer that generates heat in response to the magnetic field of the induction heating coil 76. For example, the conductive layer is made of a conductive material such as iron, nickel, copper, or the like. The fixing belt 77 may be formed by laminating a copper layer on a nickel layer. The fixing belt 77 also includes an elastic layer on the conductive layer and a release layer. The release layer is a layer that comes into direct contact with the toner. As the release layer, a tetrafluoroethylene-perfluoroalkyl vinyl ether copolymer resin (PFA) or the like having good releasability is preferable.

The frame 78 is positioned inside the region surrounded by the fixing belt 77 (interior region). The frame 78 holds the pressure pad 71.

The temperature sensor 79 detects the surface temperature of the fixing belt 77. The surface of the fixing belt 77 is an example of a temperature to be controlled. The surface temperature of the fixing belt 77 is a temperature of the fixing belt 77. The temperature of the fixing belt 77 is an example of a temperature to be controlled. For example, the temperature sensor 79 is positioned outside the fixing belt 77. The temperature sensor 79 may be positioned at the center of the fixing belt 77 in the longitudinal direction. The temperature sensor 79 may be positioned at the end of the fixing belt 77 in the longitudinal direction. The temperature sensor 79 may be positioned on a downstream side of a heating portion including the magnetic alloy shunt 74 and the induction heating coil 76, and an upstream side of the fixing nip formed between the fixing belt 77 and the pressure roller 70. The number of the temperature sensors 79 is not limited to one and there may be a plurality of temperature sensors 79. The temperature sensor 79 may be a contact type thermistor.

With the configuration described above, the fixing belt 77 and the pressure roller 70 apply heat and pressure to the print medium P passing through the fixing nip. The toner on the print medium P is melted by the heat applied from the fixing belt 77 and is applied to the surface of the print medium P by the pressure applied by the fixing belt 77 and the pressure roller 70. As a result, the toner image is fixed on the print medium P at the fixing nip. The print medium P after the fixing nip is sent into the paper discharge conveyance path 32 and discharged to the outside of the housing 10.

In some examples, the fuser 21 may include a belt having the same function as the pressure roller 70, instead of the roller such as the pressure roller 70. Likewise, the fuser 21 may include a roller having the same function as the fixing belt 77 instead of a belt such as the fixing belt 77.

An automatic temperature control function of the fuser 21 will be described.

If the induction heating coil 76 is driven at a high frequency by an inverter 82, a composite inductance of the magnetic alloy shunt 74, the induction heating coil 76, and the fixing belt 77 is generated. A resonance phenomenon occurs due to the composite inductance and a resonance capacitor 83. If the resonance frequency and the frequency for driving the induction heating coil 76 are appropriate, the induction heating coil 76 is supplied with a large amount of power. In this embodiment, it is assumed that a narrow print medium P passes through the fuser 21. The portion of the fixing belt 77 through which the print medium P passes is deprived of heat by the passage of the print medium P. On the other hand, since the portion of the fixing belt 77 where the print medium P does not pass (contact) continues to accumulate heat, the temperature increases. At this time, the magnetic alloy shunt 74 reacts to the high temperature and changes inductance value. As a result, the relationship between the resonance frequency and the frequency for driving the induction heating coil 76 is changed, and the heat generation in the high temperature portion of the fixing belt 77 is suppressed. As a result, the end of the fixing belt 77 in the longitudinal direction does not reach an abnormal high temperature.

Figure 2:
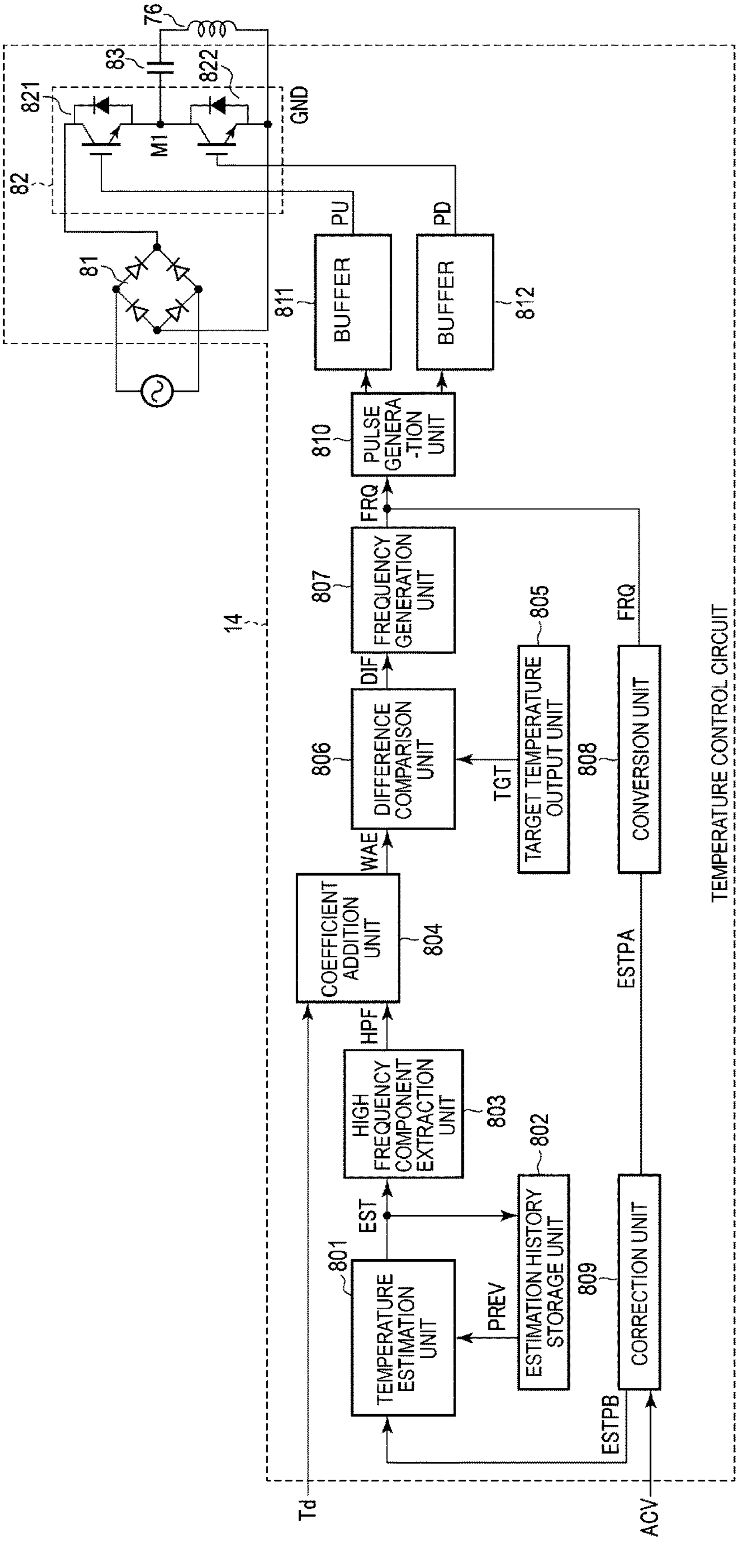
FIG. 2 is a diagram of a temperature control circuit.

The temperature control circuit 14 controls the temperature of the fuser 21. FIG. 2 is a diagram for explaining an example of the configuration of the temperature control circuit 14 according to an embodiment. The temperature control circuit 14 includes a converter 81, an inverter 82, and a resonance capacitor 83.

The converter 81 is a circuit that converts the AC voltage of the AC power supply into a DC voltage. For example, the converter 81 is a diode bridge. The converter 81 is connected to the AC power supply. The converter 81 is connected to the inverter 82.

The inverter 82 is a circuit that converts the DC voltage converted by the converter 81 into an AC voltage. The inverter 82 supplies power to the induction heating coil 76 and drives the induction heating coil 76. For example, the inverter 82 is a half-bridge inverter that includes a switch 821 and a switch 822. The inverter 82 is connected to the converter 81. The inverter 82 is connected to a series resonant circuit that includes the resonance capacitor 83 and the induction heating coil 76. The series resonant circuit is connected between a connection point M1 of the inverter 82 and GND. The connection point M1 is between the switch 821 and the switch 822. If a high frequency alternating signal is supplied to the gates of the switch 821 and the switch 822, a high frequency alternating voltage is generated between the connection point M1 and GND of the inverter 82. The series resonant circuit resonates with the high frequency, and a high power is supplied to the induction heating coil 76. This high power is used for induction heating based on the magnetic field formed by the induction heating coil 76.

For example, the switch 821 and the switch 822 are power semiconductors such as an insulated gate bipolar transistor (IGBT) or a silicon carbide (SiC) transistor, or the like. The inverter 82 is not limited to a half-bridge inverter, and may be a full-bridge inverter, a half-wave voltage resonance inverter, a quasi-resonance inverter, or the like in other examples.

The temperature control circuit 14 includes a temperature estimation unit 801, an estimation history storage unit 802, a high frequency component extraction unit 803, a coefficient addition unit 804, a target temperature output unit 805, a difference comparison unit 806, a frequency generation unit 807, a conversion unit 808, a correction unit 809, a pulse generation unit 810, a buffer 811, and a buffer 812. The temperature control circuit 14 acquires a temperature detection result Td from the temperature sensor 79. The temperature detection result Td indicates the surface temperature of the fixing belt 77 as detected by the temperature sensor 79. The temperature control circuit 14 acquires a voltage value ACV of the AC voltage of the AC power supply. For example, the voltage value ACV is an effective value. Since the AC power supply generally has an allowable variation range, the voltage value ACV varies within a predetermined range. However, if the voltage value ACV varies, the IH power changes. Therefore, it can be said that the heating operation of the induction heating coil 76 varies according to the voltage value ACV. If it is assumed that the duty control for the inverter 82 is the same, the amount of heat generation of the fixing belt 77 for voltage value ACV of 90 V is less than that for voltage value ACV of 100 V. Similarly, for voltage value ACV of 110 V, the amount of heat generation of the fixing belt 77 is greater than that for voltage value ACV of 100 V.

The temperature estimation unit 801 performs a temperature estimation process for estimating the surface temperature of the fixing belt 77. An estimation history PREV from the estimation history storage unit 802 and a power estimation result ESTPB from the correction unit 809 are input to the temperature estimation unit 801. The estimation history PREV is the history of temperature estimation result EST generated by the temperature estimation unit 801 for each short space of time dt (time periods dt). The temperature estimation result EST indicates the surface temperature of the fixing belt 77 as estimated by the temperature estimation unit 801. The power estimation result ESTPB indicates an estimated value of the currently generated IH power according to the voltage value ACV corresponding to the frequency FRQ. The power estimation result ESTPB is an example of the power estimation result showing the estimated value of the IH power corresponding to the frequency FRQ. The frequency FRQ indicates the frequency of drive pulse signal of the inverter 82 to which the induction heating coil 76 is connected. For example, the frequency FRQ is an analog voltage or digital numerical value representing the frequency. The drive pulse signal is an example of a drive signal. The drive pulse signal includes a high frequency drive pulse signal PU and a drive pulse signal PD that alternately output High.

The temperature estimation unit 801 estimates the surface temperature of the fixing belt 77 based on the estimation history PREV and the power estimation result ESTPB. Estimating the surface temperature of the fixing belt 77 based on the estimation history PREV and the power estimation result ESTPB is an example of estimating the surface temperature of the fixing belt 77 by the correction unit 809 based on the power estimation result ESTPB. The power estimation result ESTPB is based on frequency FRQ. Therefore, estimating the surface temperature of the fixing belt 77 based on the estimation history PREV and the power estimation result ESTPB is an example of estimating the surface temperature of the fixing belt 77 based on the frequency FRQ. The power estimation result ESTPB and the frequency FRQ are related to the energization of the induction heating coil 76. Therefore, estimating the surface temperature of the fixing belt 77 based on the estimation history PREV and the power estimation result ESTPB is an example of estimating the surface temperature of the fixing belt 77 based on the energization of the induction heating coil 76.

For example, the temperature estimation unit 801 estimates the amount of temperature change in the surface temperature of the fixing belt 77 based on the power estimation result ESTPB at the current time for each time period dt. The temperature estimation unit 801 adds the amount of temperature change to a temperature estimation result EST for the time period dt before the current time, which is included in the estimation history PREV. The temperature estimation unit 801 estimates the surface temperature of the fixing belt 77 at the current time based on the addition of the amount of temperature change to the temperature estimation result EST for the time period dt before the current time. The temperature estimation unit 801 reuses the temperature estimation result EST of the time period dt from before the current time to obtain the temperature estimation result EST at the current time. The temperature estimation unit 801 outputs the temperature estimation result EST to the estimation history storage unit 802 and the high frequency component extraction unit 803.

The estimation history storage unit 802 holds the history of the temperature estimation result EST. The estimation history storage unit 802 outputs the estimation history PREV to the temperature estimation unit 801.

The high frequency component extraction unit 803 performs a high-pass filter process for extracting the high frequency component of the temperature estimation result EST. For example, the high frequency component extraction unit 803 cancels the DC component of the temperature estimation result EST and extracts only the high frequency component. The high frequency component extraction unit 803 outputs the high frequency component HPF, which is a signal indicating the extracted high frequency component, to the coefficient addition unit 804.

The coefficient addition unit 804 performs a coefficient addition process for correcting the temperature detection result Td. The temperature detection result Td from the temperature sensor 79 and the high frequency component HPF from the high frequency component extraction unit 803 are input to the coefficient addition unit 804. The coefficient addition unit 804 corrects the temperature detection result Td based on the high frequency component HPF. Specifically, the coefficient addition unit 804 calculates the correction temperature value WAE based on the temperature detection result Td and the high frequency component HPF. The high frequency component HPF is based on the temperature estimation result EST. Therefore, it can be said that the correction temperature value WAE is based on the temperature estimation result EST and the temperature detection result Td. The coefficient addition unit 804 is an example of a calculation unit for calculating the correction temperature value WAE. The coefficient addition unit 804 outputs the correction temperature value WAE to the difference comparison unit 806.

The target temperature output unit 805 performs an output process for outputting a preset target temperature TGT to the difference comparison unit 806. The target temperature TGT is a target value of the surface temperature of the fixing belt 77. The target temperature TGT can be changed by rewriting by a command from the processor 22. The target temperature TGT may be stored in the memory 23 or stored in the memory 25.

For example, the target temperature TGT can be set separately for each printing process.

In one example, the target temperature TGT to be used varies according to the characteristics of the print medium P used in each printing process. For example, one variable characteristic of a print medium P is sheet thickness. The sheet thickness may vary by paper type or paper quality. Generally, the target temperature TGT is set such that a predetermined temperature can be maintained when the print medium P is plain paper (e.g., basic or standard paper type). In general, the amount of heat withdrawn from the fixing belt 77 by the print medium P when the print medium P passes through the fuser 21 increases for thick paper as compared to plain paper. Thus, the surface temperature of the fixing belt 77 tends to become lower when printing on thick paper than when printing on plain paper. Thus, if the print medium P is known to be thick paper, the target temperature TGT is set higher than the target temperature TGT associated with plain paper, in consideration of the greater amount of heat withdrawn from the fixing belt 77 by the thick paper. As a result, the surface temperature of the fixing belt 77 can be more easily maintained at a predetermined temperature. If the print medium P is known to be thinner than plain paper, the target temperature TGT can be set lower than the target temperature TGT associated with plain paper.

In another example, the target temperature TGT may vary according to the statuses of the printing process.

In this context, the possible statuses of the printing process include, for example, an inrush current prevention state, a start-up heating state, a ready state, a print start state, a printing state, and an energy saving ready state, and the like, but is not limited thereto.

In the inrush current prevention state, the target temperature TGT is set to increase stepwise such that a large current does not flow suddenly. In the start-up heating state, the target temperature TGT is set to be higher such that the reference temperature suitable for printing can be reached quickly. In the ready state, the target temperature TGT is set to be slightly lower than the target temperature TGT in the start-up heating state to save energy after the printer is ready. In the printing start state, the target temperature TGT is set to be higher than the target temperature TGT for the printing state for a period of time shortly before printing begins such that the temperature does not decrease below the appropriate temperature at the beginning of printing. In the printing state, the target temperature TGT is set to the reference temperature considered suitable for printing. In the energy-saving ready state, the target temperature TGT is set to be lower than the target temperature TGT in the ready state if the ready state continues for a long time.

The difference comparison unit 806 performs a difference calculation process. The difference comparison unit 806 compares the target temperature TGT from the target temperature output unit 805 with the correction temperature value WAE from the coefficient addition unit 804. The difference comparison unit 806 calculates a difference DIF based on the comparison between the target temperature TGT and the correction temperature value WAE. The difference DIF is an example of the comparison result by the difference comparison unit 806. The difference comparison unit 806 is an example of the temperature comparison unit. In this example, the difference DIF will be described as a value obtained by subtracting the correction temperature value WAE from the target temperature TGT, but the opposite may be true in other examples. If the correction temperature value WAE is lower than the target temperature TGT, the difference DIF is a positive value. If the correction temperature value WAE is higher than the target temperature TGT, the difference DIF is a negative value. The difference DIF shows the relationship between the target temperature TGT and the correction temperature value WAE. The difference comparison unit 806 outputs the difference DIF to the frequency generation unit 807.

The frequency generation unit 807 performs a frequency generation process for generating a frequency FRQ. The frequency generation unit 807 generates the frequency FRQ based on the difference DIF. The generating the frequency FRQ includes determining the frequency FRQ. For example, if the correction temperature value WAE is higher than the target temperature TGT, the frequency generation unit 807 raises the frequency FRQ to be higher than if the correction temperature value WAE is equal to the target temperature TGT. This is to reduce the IH power. If the correction temperature value WAE is lower than the target temperature TGT, the frequency generation unit 807 decreases the frequency FRQ to be lower than if the correction temperature value WAE is equal to the target temperature TGT. This is to increase the IH power. The difference DIF is based on the target temperature TGT and the correction temperature value WAE. Therefore, the generating the frequency FRQ based on the difference DIF is an example of generating the frequency FRQ based on the temperature estimation result EST by the temperature estimation unit 801 and the temperature detection result Td by the temperature sensor 79, and the target temperature TGT. The frequency generation unit 807 outputs the frequency FRQ to the conversion unit 808 and the pulse generation unit 810.

The conversion unit 808 performs a conversion process of converting the frequency FRQ into a power estimation result ESTPA. The power estimation result ESTPA indicates an estimated value of the currently generated IH power corresponding to the frequency FRQ if it is assumed that the voltage value ACV is 100 V. The power estimation result ESTPA is an example of the power estimation result showing the estimated value of the IH power corresponding to the frequency FRQ. The converting the frequency FRQ to the power estimation result ESTPA is an example of estimating the IH power based on the frequency FRQ. The conversion unit 808 is an example of a power estimation unit that estimates IH power. The conversion unit 808 outputs the power estimation result ESTPA to the correction unit 809 based on the conversion from the frequency FRQ to the power estimation result ESTPA.

The correction unit 809 performs a correction process for correcting the power estimation result ESTPA based on the voltage value ACV. The correcting the power estimation result ESTPA based on the voltage value ACV includes converting the power estimation result ESTPA based on the voltage value ACV into the power estimation result ESTPB. The correcting the power estimation result ESTPA based on the voltage value ACV is an example of estimating the IH power based on the voltage value ACV. The correction unit 809 is an example of the power estimation unit that estimates IH power. The correction unit 809 outputs the power estimation result ESTPB to the temperature estimation unit 801.

The pulse generation unit 810 performs a pulse generation process for generating a pulse signal based on the frequency FRQ. The pulse signal includes a high frequency first pulse signal and a second pulse signal that alternately output High. The second pulse signal is a pulse train obtained by inverting High and Low of the first pulse signal. The first pulse signal and the second pulse signal are pulse trains having a predetermined duty corresponding to the frequency FRQ. The first pulse signal and the second pulse signal are pulse trains that repeat a High period and a Low period according to a predetermined duty. For example, the predetermined duty is 50%. If the first pulse signal and the second pulse signal include a dead time, the predetermined duty may be a value less than 50%. The dead time includes the time if both the first pulse signal and the second pulse signal are Low between the timing at which the first pulse signal transitions from High to Low and the timing at which the second pulse signal transitions from Low to High. The dead time includes the time if both the first pulse signal and the second pulse signal are Low between the timing at which the second pulse signal transitions from High to Low and the timing at which the first pulse signal transitions from Low to High. The pulse generation unit 810 outputs the first pulse signal to the buffer 811. The pulse generation unit 810 outputs the second pulse signal to the buffer 812. The pulse signal is an example of the drive signal because it is the source of the drive pulse signal including the drive pulse signal PU and the drive pulse signal PD.

The buffer 811 supplies the drive pulse signal PU obtained by converting the first pulse signal into the gate voltage of the switch 821 of the inverter 82 to the gate of the switch 821.

The buffer 812 supplies the drive pulse signal PD obtained by converting the second pulse signal into the gate voltage of the switch 821 of the inverter 82 to the gate of the switch. The drive pulse signal PD is a pulse train obtained by inverting High and Low of the drive pulse signal PU. The drive pulse signal PU and the drive pulse signal PD are pulse trains having a predetermined duty corresponding to the frequency FRQ. The drive pulse signal PU and the drive pulse signal PD are pulse trains that repeat a High period and a Low period according to a predetermined duty. Note that, in this example, since the inverter 82 is described as a half-bridge inverter, two drive signals are supplied to the inverter 82, but embodiments are not limited thereto. If the inverter 82 is a full bridge inverter, four drive signals are supplied to the inverter 82.

As described above, the temperature control circuit 14 adjusts the IH power based on the temperature detection result Td, the estimation history PREV, and the frequency FRQ. As a result, the temperature control circuit 14 controls the surface temperature of the fixing belt 77 by induction heating based on the magnetic field formed by the induction heating coil 76. This control will be referred to as weighted average control with estimate temperature (WAE control) in this example.

Note that the temperature estimation unit 801 of the temperature control circuit 14, the estimation history storage unit 802, the high frequency component extraction unit 803, the coefficient addition unit 804, the target temperature output unit 805, the difference comparison unit 806, the frequency generation unit 807, the conversion unit 808, the correction unit 809, and the pulse generation unit 810 are not limited to those implemented by software, and may be configured by hardware by an electric circuit.

Hereinafter, WAE control will be described in detail.

Figure 3:
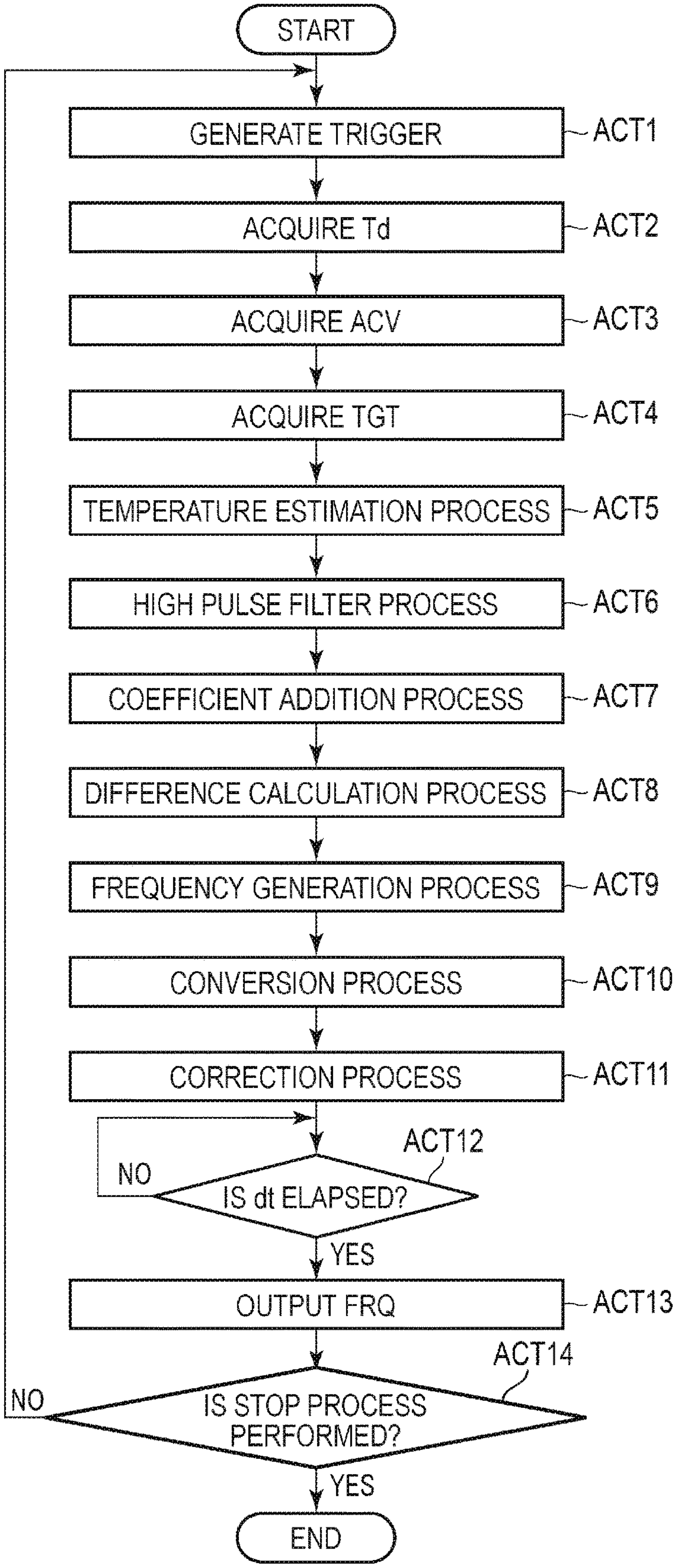
FIG. 3 is flowchart of an operation of a temperature control circuit.
Figure 4:
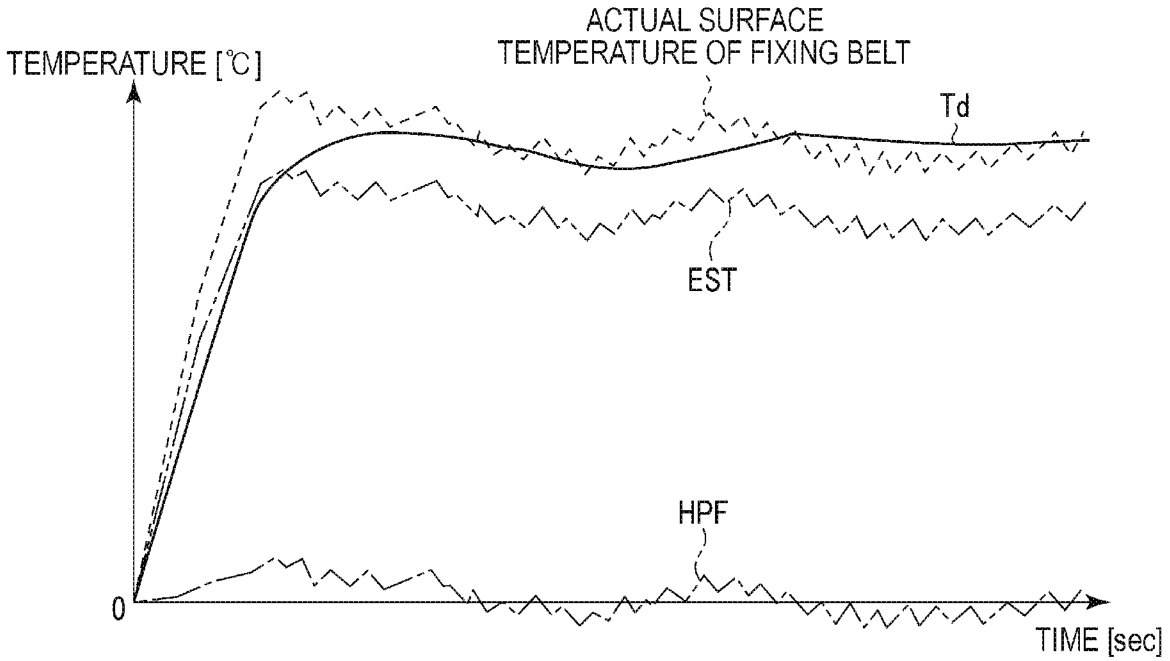
FIG. 4 is a graph for explaining aspects of an operation of a temperature control circuit.
Figure 5:
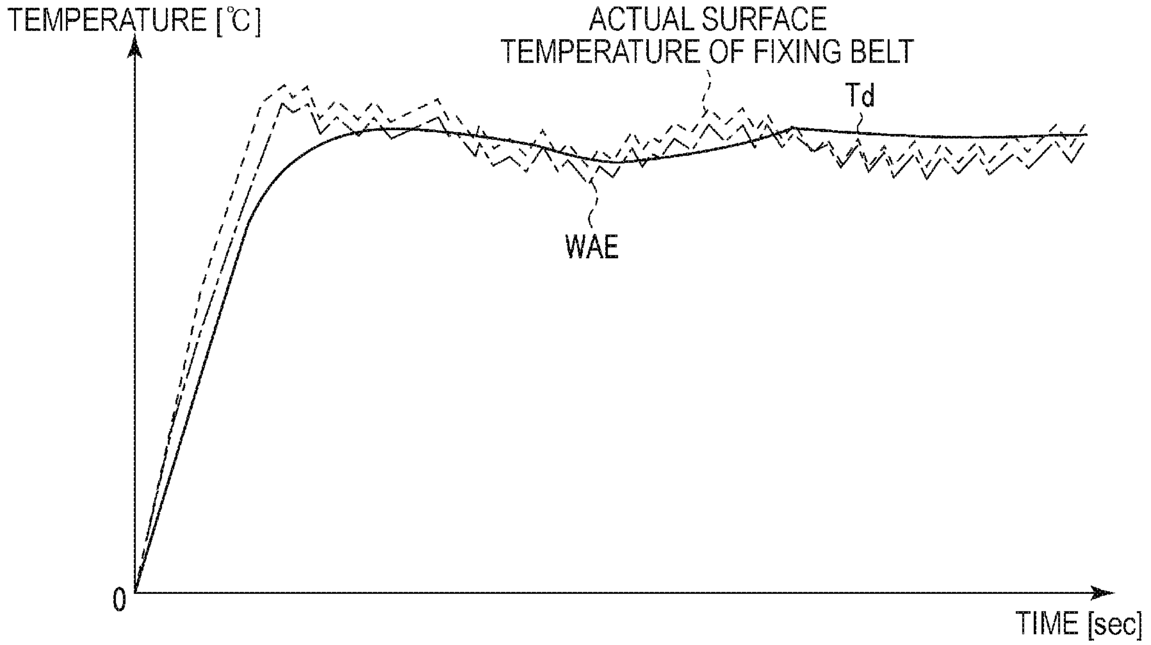
FIG. 5 is a graph for explaining aspects of an operation of a temperature control circuit.

FIG. 3 is a flowchart for explaining output of the frequency FRQ in WAE control. FIGS. 4 and 5 are explanatory views for explaining each signal and the like in WAE control. The horizontal axis of FIGS. 4 and 5 represents the time. The vertical axis of FIGS. 4 and 5 represents the temperature.

The temperature control circuit 14 generates a trigger for starting the process for every time period dt (ACT 1). At ACT 1, for example, the temperature control circuit 14 starts counting by the timer based on an instruction to start WAE control from the system controller 13. The temperature control circuit 14 ends the counting by the timer based on an instruction to end WAE control from the system controller 13. The temperature control circuit 14 generates triggers at time period dt intervals based on the counts by the timer during the operation of the image forming apparatus 1.

The temperature control circuit 14 acquires the temperature detection result Td (ACT 2). At ACT 2, for example, the temperature control circuit 14 acquires the temperature detection result Td from the temperature sensor 79.

The temperature control circuit 14 acquires the voltage value ACV (ACT 3). At ACT 3, for example, the temperature control circuit 14 acquires the voltage value ACV from the voltage detection unit that detects the voltage value ACV.

The temperature control circuit 14 acquires the target temperature TGT (ACT 4). At ACT 4, for example, the temperature control circuit 14 acquires the target temperature TGT based on the signal from the system controller 13.

The temperature estimation unit 801 performs a temperature estimation process (ACT 5). For example, the temperature estimation unit 801 acquires the power estimation result ESTPB at the current time from the correction unit 809. The temperature estimation unit 801 acquires the temperature estimation result EST for the time period dt before the current time as the estimation history PREV from the estimation history storage unit 802. The temperature estimation unit 801 estimates the surface temperature of the fixing belt 77 based on the estimation history PREV and the power estimation result ESTPB. The temperature estimation unit 801 outputs the temperature estimation result EST to the estimation history storage unit 802 and the high frequency component extraction unit 803 based on the estimation of the surface temperature of the fixing belt 77.

The heat transfer can be expressed equivalently by the RC time constant of the electric circuit. The heat capacity is replaced by the capacitor C. The resistance of heat transfer is replaced by resistance R. The heat source is replaced by a voltage source. The temperature estimation unit 801 simulates a RC circuit in which the values of each element are set in advance in real time. The temperature estimation unit 801 uses the power estimation result ESTPB based on the frequency FRQ. The power estimation result ESTPB corresponds to the voltage value applied to the RC circuit. That is, the IH power increases as the frequency FRQ decreases, and accordingly, as a means of simulating this, the temperature estimation unit 801 increases the voltage applied to the RC circuit. On the other hand, the IH power decreases as the frequency FRQ increases, and accordingly, as a means of simulating this, the temperature estimation unit 801 decreases the voltage applied to the RC circuit. The temperature estimation unit 801 estimates the amount of heat applied to the fixing belt 77 based on the RC circuit and the power estimation result ESTPB. The temperature estimation unit 801 estimates the surface temperature of the fixing belt 77 based on the amount of heat applied to the fixing belt 77 and the estimation history PREV. As described above, the temperature estimation unit 801 estimates the surface temperature of the fixing belt 77 based on the RC circuit and the power estimation result ESTPB.

As illustrated in FIG. 4, there is a difference between the temperature detection result Td and the actual surface temperature of the fixing belt 77. The actual surface temperature of the fixing belt 77 changes with a short cycle because the driving frequency of the induction heating changes frequently. On the other hand, there are circumstances that the temperature sensor 79 may have poor responsiveness to temperature changes due to its own heat capacity and the characteristics of the temperature-sensitive material. In particular, cheaper temperature sensors tend to have poorer responsiveness. As a result, the temperature detection result Td cannot accurately follow the actual surface temperature of the fixing belt 77 which changes at a high frequency. That is, the temperature detection result Td detected by the temperature sensor 79 is a delayed result which may differ from the actual surface temperature of the fixing belt 77. Due to such delay (the lack of sensor responsiveness), the temperature detection result Td as detected by the temperature sensor 79 corresponds to a smoothed state lacking details of the fine (high frequency) changes in the actual surface temperature of the fixing belt 77.

However, as illustrated in FIG. 4, the temperature estimation result EST more appropriately follows the changes in the actual surface temperature of the fixing belt 77 corresponding to the frequency of the drive pulse signal supplied to the inverter 82 (or the IH power based on the frequency). However, since the temperature estimation result EST is only a simulation result, its absolute value may differ from the actual surface temperature of the fixing belt 77 due to differences in actual conditions from simulation parameters and the like.

The high frequency component extraction unit 803 performs a high-pass filter process (ACT 6). At ACT 6, for example, the high frequency component extraction unit 803 extracts the high frequency component of the temperature estimation result EST. As illustrated in FIG. 4, the high frequency component HPF appropriately follows the change in the actual surface temperature of the fixing belt 77. The high frequency component extraction unit 803 outputs just the high frequency component HPF to the coefficient addition unit 804.

The coefficient addition unit 804 performs a coefficient addition process (ACT 7). At ACT 7, for example, the coefficient addition unit 804 acquires the temperature detection result Td (as acquired by the temperature control circuit 14) at ACT 2. The coefficient addition unit 804 acquires the high frequency component HPF from the high frequency component extraction unit 803. The coefficient addition unit 804 calculates the correction temperature value WAE based on the temperature detection result Td and the high frequency component HPF. In a typical example, the coefficient addition unit 804 multiplies the high frequency component HPF by a preset coefficient KA. The coefficient addition unit 804 adjusts the value of the high frequency component HPF to be added to the temperature detection result Td with the coefficient KA. The coefficient addition unit 804 adds the high frequency component HPF multiplied by the coefficient KA to the temperature detection result Td. The coefficient addition unit 804 calculates the correction temperature value WAE based on this addition process.

For example, if the coefficient KA is 1, the coefficient addition unit 804 directly adds the high frequency component HPF to the temperature detection result Td. If the coefficient KA is 0.1, the coefficient addition unit 804 adds a value of 1/10 of the high frequency component HPF to the temperature detection result Td. In such a case, the correction temperature value WAE incorporates little to no effect of the high frequency component HPF and is thus close to the temperature detection result Td. When the coefficient KA is 1 or more, the correction temperature value WAE can more strongly reflect the effect of the high frequency component HPF. Experiments have shown that the coefficient KA set in the coefficient addition unit 804 is preferably not a very extreme value (high or low), but rather a value near 1.

FIG. 5 is an explanatory diagram for explaining an example of the actual surface temperature of the fixing belt 77, the temperature detection result Td, and the correction temperature value WAE. In the WAE control, the temperature control circuit 14 estimates a fine temperature change of the surface temperature of the fixing belt 77 based on the temperature detection result Td and the high frequency component HPF of the temperature estimation result EST. Therefore, as illustrated in FIG. 5, the correction temperature value WAE is a value that more appropriately follows the actual surface temperature of the fixing belt 77.

The difference comparison unit 806 performs a difference calculation process (ACT 8). For example, at ACT 8, the difference comparison unit 806 acquires the target temperature TGT from the target temperature output unit 805. The difference comparison unit 806 acquires the correction temperature value WAE from the coefficient addition unit 804. The difference comparison unit 806 compares the target temperature TGT with the correction temperature value WAE. The difference comparison unit 806 calculates the difference DIF obtained by subtracting the correction temperature value WAE from the target temperature TGT. The difference comparison unit 806 outputs the difference DIF to the frequency generation unit 807.

The frequency generation unit 807 performs a frequency generation process (ACT 9). At ACT 9, for example, the frequency generation unit 807 acquires the difference DIF from the difference comparison unit 806. The frequency generation unit 807 generates the frequency FRQ based on the difference DIF. The frequency generation unit 807 may generate the frequency FRQ based on the difference DIF and the voltage value ACV. The frequency generation unit 807 outputs the frequency FRQ to the conversion unit 808. The frequency generation unit 807 stores the frequency FRQ until the timing of outputting the frequency FRQ to the pulse generation unit 810 is reached.

The conversion unit 808 performs a conversion process (ACT 10). At ACT 10, for example, the conversion unit 808 acquires the frequency FRQ from the frequency generation unit 807. The conversion unit 808 converts the frequency FRQ into the power estimation result ESTPA. The conversion unit 808 outputs the power estimation result ESTPA to the correction unit 809.

The correction unit 809 performs a correction process (ACT 11). At ACT 11, for example, the correction unit 809 acquires the power estimation result ESTPA from the conversion unit 808. The correction unit 809 acquires the voltage value ACV acquired by the temperature control circuit 14 at ACT 3. The correction unit 809 corrects the power estimation result ESTPA based on the voltage value ACV. The correction unit 809 acquires the power estimation result ESTPB based on the correction of the power estimation result ESTPA. The correction unit 809 outputs the power estimation result ESTPB to the temperature estimation unit 801.

The temperature control circuit 14 determines whether or not a time period dt elapses (ACT 12). If a time period dt has not elapsed (ACT 12, NO), the temperature control circuit 14 waits until a time period dt elapses. If a time period dt has elapsed (ACT 12, YES), the frequency generation unit 807 outputs the frequency FRQ to the pulse generation unit 810 (ACT 13). At ACT 12, for example, the frequency generation unit 807 outputs the frequency FRQ generated at time period dt intervals to the pulse generation unit 810 for each time period dt interval. Further, the value of the frequency FRQ output by the frequency generation unit 807 is stored by the frequency generation unit 807 until it is updated after the elapse of the next time period dt interval.

The temperature control circuit 14 determines whether or not to execute the WAE control stop process (ACT 14). At ACT 14, for example, the temperature control circuit 14 stops the WAE control based on the instruction to stop the WAE control from the system controller 13. If the temperature control circuit 14 does not execute the WAE control stop process (ACT 14, NO), the process proceeds from ACT 14 to ACT 1. The temperature control circuit 14 repeats the processes illustrated in FIG. 3 for each time period dt during the operation of the image forming apparatus 1. If the temperature control circuit 14 executes the WAE control stop process (ACT 14, YES), the temperature control circuit 14 ends the process illustrated in FIG. 3.

Figure 6:
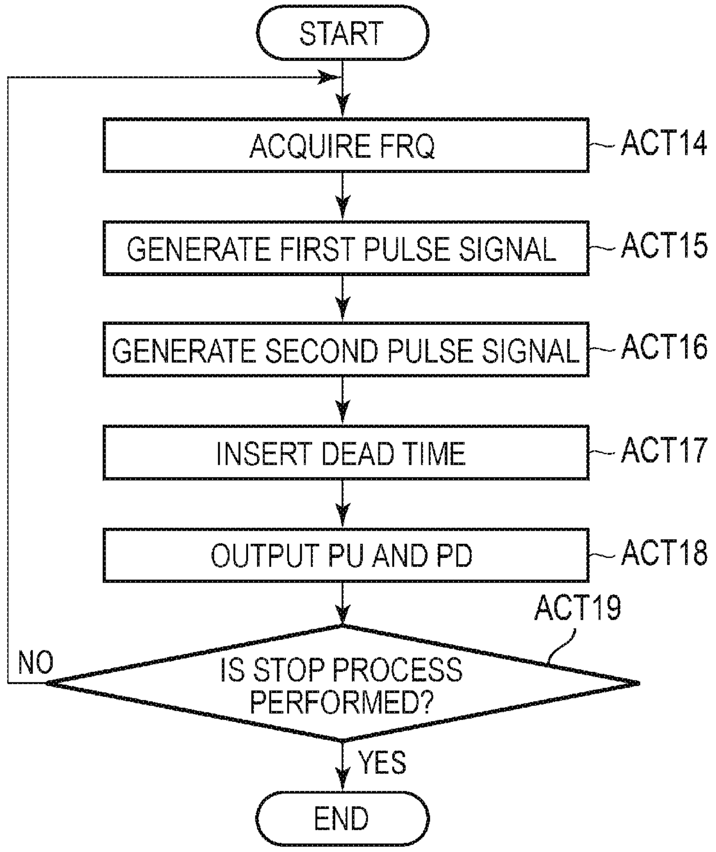
FIG. 6 is a flowchart of an operation of a temperature control circuit.

FIG. 6 is a flowchart for explaining the output of the drive pulse signal in the WAE control.

The pulse generation unit 810 acquires the frequency FRQ from the frequency generation unit 807 (ACT 14). At ACT 14, for example, the pulse generation unit 810 acquires the frequency FRQ from the frequency generation unit 807 at time period dt intervals.

The pulse generation unit 810 generates a first pulse signal based on the frequency FRQ (ACT 15). At ACT 15, for example, the pulse generation unit 810 generates a first pulse signal having a duty of 50% corresponding to the frequency FRQ. If the frequency FRQ is 50 kHz, one cycle is 20 μs. The pulse generation unit 810 allocates 10 μs as High and 10 μs as Low in one cycle of 20 μs.

The pulse generation unit 810 generates a second pulse signal based on the frequency FRQ (ACT 16). At ACT 16, for example, the pulse generation unit 810 generates a second pulse signal obtained by inverting High and Low of the first pulse signal.

The pulse generation unit 810 inserts a dead time into the pulse signal (ACT 17). At ACT 17, for example, the pulse generation unit 810 inserts a dead time into the first pulse signal having a duty of 50% and generates a first pulse signal having a duty of 48%. The pulse generation unit 810 inserts a dead time into the second pulse signal having a duty of 50% and generates a second pulse signal having a duty of 48%. The dead time is provided in order to prevent a short circuit in advance if the switch 821 and the switch 822 of the inverter 82 are turned on at the same time. The pulse generation unit 810 outputs the first pulse signal to the buffer 811. The pulse generation unit 810 outputs the second pulse signal to the buffer 812.

The buffer 811 outputs a drive pulse signal PU, and the buffer 812 outputs a drive pulse signal PD (ACT 18). For example, at ACT 18, the buffer 811 acquires the first pulse signal from the pulse generation unit 810. The buffer 811 supplies the drive pulse signal PU obtained by converting the first pulse signal into the gate voltage of the switch 821 of the inverter 82 to the gate of the switch 821. The buffer 812 acquires the second pulse signal from the pulse generation unit 810. The buffer 812 supplies the drive pulse signal PD obtained by converting the second pulse signal into the gate voltage of the switch 821 of the inverter 82 to the gate of the switch.

The temperature control circuit 14 determines whether or not to execute the WAE control stop process (ACT 19). At ACT 19, for example, the temperature control circuit 14 stops the WAE control based on the instruction to stop the WAE control from the system controller 13. If the temperature control circuit 14 does not execute the WAE control stop process (ACT 19, NO), the process proceeds from ACT 19 to ACT 14. The temperature control circuit 14 repeats the processes illustrated in FIG. 6 at time period dt intervals during the operation of the image forming apparatus 1. If the temperature control circuit 14 executes the WAE control stop process (ACT 19, YES), the temperature control circuit 14 ends the process illustrated in FIG. 6.

An example of the frequency generation process by the frequency generation unit 807 will be described.

Figure 7:
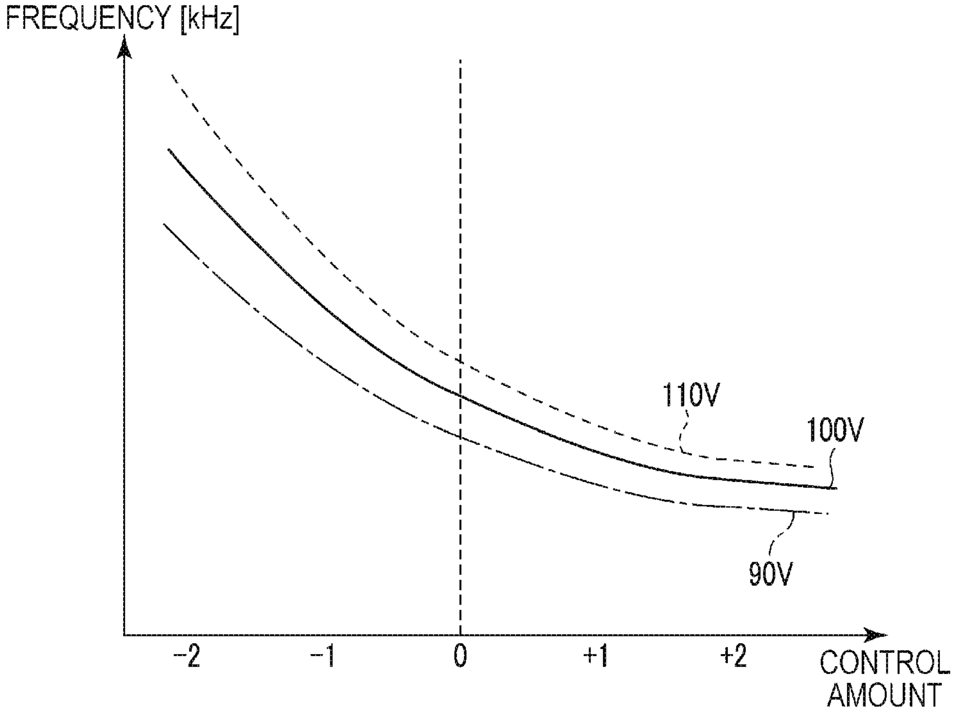
FIG. 7 is a graph for explaining aspects of a frequency generation process of a temperature control circuit.

FIG. 7 illustrates a graph of a function for each of three different voltage values ACV showing the relationship between the control amount and the frequency of the drive pulse signal of the inverter 82.

The horizontal axis represents the control amount of IH power. The control amount is a power increase and decrease coefficient indicating the degree of increase and decrease in IH power. The control amount may be the value of the difference DIF itself or a value having a correlation with the difference DIF. As the difference DIF increases, the control amount also increases. The control amount of 0 indicates that the correction temperature value WAE is the same as the target temperature TGT, so that the IH power may be kept as it is. The control amount being positive indicates a situation in which the IH power needs to be increased because the correction temperature value WAE is lower than the target temperature TGT. The control amount being negative indicates a situation in which the IH power needs to be decreased because the correction temperature value WAE is higher than the target temperature TGT.

The vertical axis is the frequency of the drive pulse signal of the inverter 82 corresponding to the frequency FRQ.

Since the inverter 82 utilizes the LC resonance phenomenon, the relationship between the frequency FRQ and the IH power is non-linear. Therefore, as illustrated in FIG. 7, a function showing the relationship between the control amount and the frequency of the drive pulse signal of the inverter 82 is prepared. The solid line shows a graph line of a function (also referred to as an FRQ100 function) for voltage value ACV of 100 V. The broken line shows a graph line of a function (also referred to as an FRQ110 function) for voltage value ACV of 110 V. The alternate long and short dash line shows a graph line of a function (also referred to as an FRQ90 function) for voltage value ACV of 90 V. FIG. 7 shows three functions for three different voltage values ACV, but four or more functions corresponding to different voltage values ACV may be prepared.

According to the characteristics of the inverter 82, in a situation where the control amount is positive and the IH power needs to be increased, the frequency FRQ needs to be lower than the frequency FRQ for control amount of 0. According to the characteristics of the inverter 82, in a situation where the control amount is negative and the IH power needs to be decreased, the frequency FRQ needs to be higher than the frequency FRQ for control amount of 0.

The frequency generation unit 807 generates a frequency FRQ based on the difference DIF and the voltage value ACV, as illustrated below. The frequency generation unit 807 selects a function associated with the voltage value ACV from a predetermined plurality of functions corresponding to different voltage values ACV. The frequency generation unit 807 determines the control amount based on the difference DIF. The frequency generation unit 807 determines the frequency FRQ according to the control amount based on the selected function. For example, for voltage value ACV of 90 V, the frequency generation unit 807 selects the predetermined FRQ90 function. The frequency generation unit 807 determines (sets) the frequency FRQ according to the control amount using the FRQ90 function. The frequency FRQ determined according to the control amount based on the FRQ90 function is lower than the frequency FRQ that would be determined according to the same control amount using the FRQ100 function. The decrease in the IH power due to the voltage value ACV being 90 V (lower than 100 V) is offset by the increase in the IH power that accompanies the decrease of the frequency FRQ for voltage value ACV of 90 V from the voltage value ACV of 100 V.

The frequency generation unit 807 can generate the frequency FRQ according to the variation of the voltage value ACV by generating the frequency FRQ based on different voltage values ACV. As a result, the frequency generation unit 807 can generate a frequency FRQ for appropriately controlling the IH power even if the voltage value ACV varies.

The frequency generation unit 807 preferably generates a frequency FRQ based on the difference DIF and the voltage value ACV, but embodiments are not limited thereto. The frequency generation unit 807 may generate a frequency FRQ based on the difference DIF without considering the voltage value ACV. In this example, the frequency generation unit 807 may use the FRQ100 function for voltage value ACV of 100 V.

The frequency generation unit 807 may generate a frequency FRQ by reference to table data instead of calculation from a selected predetermined function. The table data may be data in which the control amount and the frequency of the drive pulse signal of the inverter 82 are associated with each other. The table data may include data for each of several voltage values ACV with the control amount and the frequency of the drive pulse signal of the inverter 82 associated with each other. The table data may be stored in the memory 25.

An example of the conversion process by the conversion unit 808 will be described.

Figure 8:
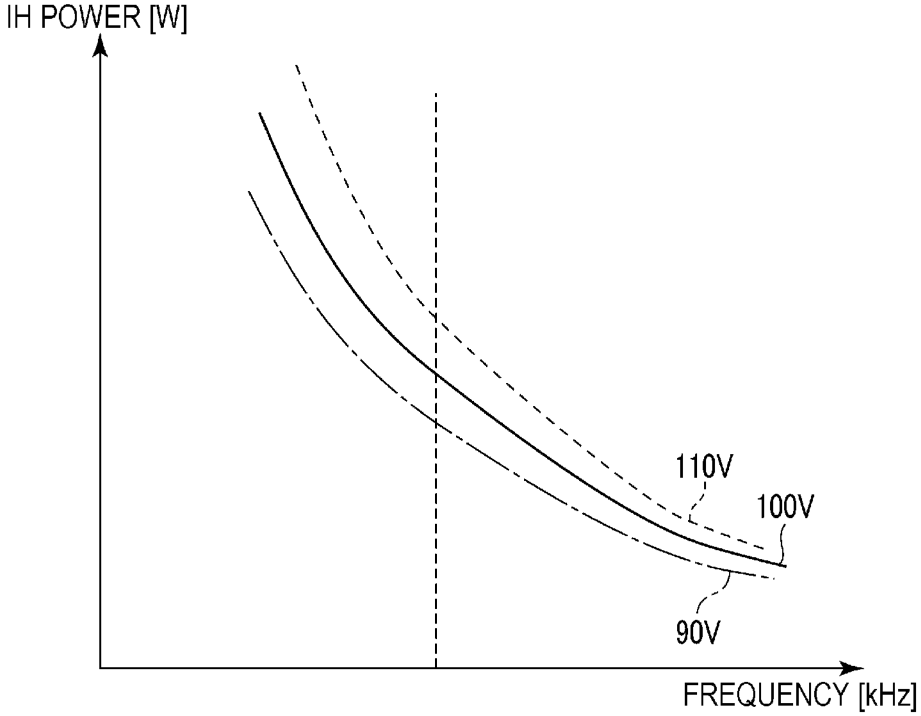
FIG. 8 is a graph for explaining aspects of a conversion process of a temperature control circuit.

FIG. 8 illustrates a graph line of a function for different voltage values ACV showing the relationship between the frequency of the drive pulse signal of the inverter 82 and the IH power.

The horizontal axis is the frequency of the drive pulse signal of the inverter 82 corresponding to the frequency FRQ. The vertical axis represents the IH power.

The solid line shows a graph line of a function (also referred to as an F2P100 function) for voltage value ACV of 100 V. The broken line shows a graph line of a function (also referred to as an F2P110 function) for voltage value ACV of 110 V. The alternate long and short dash line shows a graph line of a function (also referred to as an F2P90 function) for voltage value ACV of 90 V.

Since the inverter 82 utilizes the LC resonance phenomenon, the relationship between the frequency FRQ and the IH power is non-linear. The IH power increases as the frequency FRQ decreases, and the IH power decreases as the frequency FRQ increases.

The conversion unit 808 converts the frequency FRQ into the power estimation result ESTPA, as exemplified below. The conversion unit 808 acquires the IH power corresponding to the frequency FRQ as the power estimation result ESTPA based on the F2P100 function for voltage value ACV of 100 V.

The conversion unit 808 may convert the frequency FRQ into the power estimation result ESTPA with reference to the table data instead of the function. The table data is data in which the frequency of the drive pulse signal of the inverter 82 and the IH power are associated with each other. The table data may be stored in the memory 25.

An example of the correction process by the correction unit 809 will be described.

Figure 9:
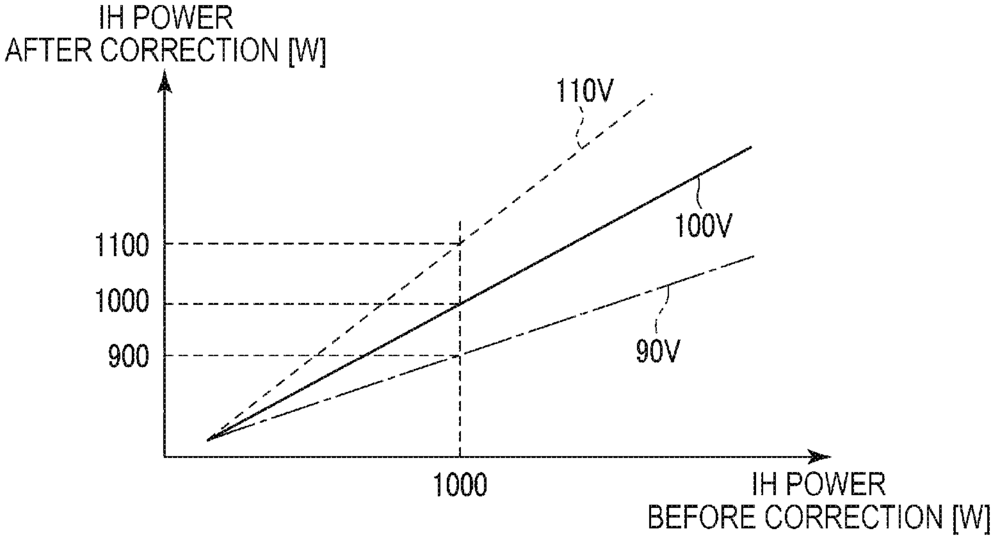
FIG. 9 is a graph for explaining aspects of a correction process of a temperature control circuit.

FIG. 9 illustrates a graph line of a function for different voltage values ACV showing the relationship between the IH power before correction and the IH power after correction.

The horizontal axis represents the IH power before correction. The IH power before correction corresponds to the power estimation result ESTPA. The vertical axis represents the IH power after correction. The IH power after correction corresponds to the power estimation result ESTPB.

The solid line shows a graph line of a function (a function with slope of 1) for voltage value ACV of 100 V. The broken line shows a graph line of a function (a function with slope of 1.1) for voltage value ACV of 110 V. The alternate long and short dash line shows a graph line of a function (a function with slope of 0.9) for voltage value ACV of 90 V. FIG. 9 shows three functions for three different voltage values ACV, but four or more functions corresponding to different voltage values ACV may be prepared.

The correction unit 809 corrects the power estimation result ESTPA based on the voltage value ACV, as illustrated below. The correction unit 809 selects a function associated with the voltage value ACV from a plurality of functions based on the voltage value ACV. The correction unit 809 converts the IH power before correction corresponding to the power estimation result ESTPA into the IH power after correction based on the selected function. The correction unit 809 acquires the IH power after correction obtained by converting the IH power before correction corresponding to the power estimation result ESTPA, as the power estimation result ESTPB.

For example, it is assumed that the IH power before correction corresponding to the power estimation result ESTPA is 1000 W. For the voltage value ACV of 90 V, the correction unit 809 converts 1000 W into 900 W based on the function associated with the voltage value ACV. The correction unit 809 acquires 900 W as the power estimation result ESTPB. The power estimation result ESTPB is decreased to be lower than the power estimation result ESTPA. For voltage value ACV of 110 V, the correction unit 809 converts 1000 W into 1100 W based on the function associated with the voltage value ACV. The correction unit 809 acquires 1100 W as the power estimation result ESTPB. The power estimation result ESTPB is increased to be higher than the power estimation result ESTPA.

The correction unit 809 can estimate the IH power according to the variation of the voltage value ACV by correcting the power estimation result ESTPA based on the voltage value ACV. As a result, the correction unit 809 can prevent the power estimation result ESTPB from deviating from the IH power used for the actual heat generation operation even if the voltage value ACV varies. Since the estimation accuracy of the IH power by the correction unit 809 is improved, it is possible to prevent the temperature estimation result EST by the temperature estimation unit 801 from deviating significantly from the actual surface temperature of the fixing belt 77.

The coefficient KB to be multiplied by the IH power before correction is not limited to a fixed value corresponding to the voltage value ACV representing a linear relationship as illustrated in FIG. 9. The coefficient KB may be expressed by any function for each voltage value ACV.

The correction unit 809 may correct the power estimation result ESTPA by reference to table data instead of a function. The table data may be data in which the IH power before correction obtained by actual measurement and the IH power after correction for each voltage value ACV are associated with each other. The table data may be stored in the memory 25.

An example of a drive pulse signal will be described.

Figure 10:
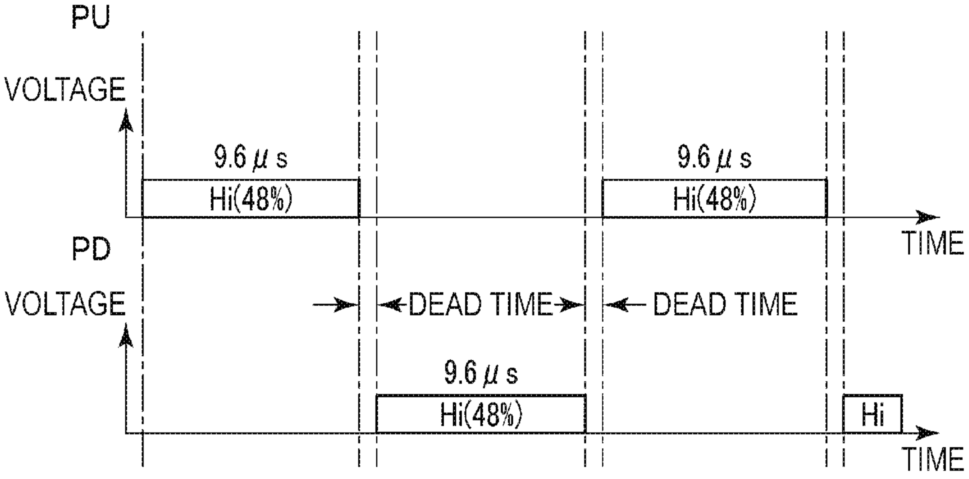
FIG. 10 is a diagram illustrating a drive pulse signal.

FIG. 10 is a diagram illustrating a drive pulse signal. FIG. 10 illustrates the drive pulse signal PU in the upper section of the figure and the drive pulse signal PD in the lower section of the figure.

The horizontal axis represents time. The vertical axis represents the voltage.

If the frequency FRQ is 50 kHz, one cycle of the drive pulse signal PU and the drive pulse signal PD is 20 μs. The drive pulse signal PU and the drive pulse signal PD are pulse signals having a duty of 48% obtained by subtracting the dead time from the duty of 50% of the original signal. The drive pulse signal PU and the drive pulse signal PD alternately output High.

In an example, the conversion unit 808 and the correction unit 809 are illustrated as separate, but embodiments are not limited thereto. The temperature control circuit 14 may include a power estimation unit that estimates the IH power based on the frequency FRQ and the voltage value ACV, instead of the conversion unit 808 and the correction unit 809. Estimating the IH power based on the frequency FRQ and the voltage value ACV includes converting the frequency FRQ into a power estimation result ESTPB according to the voltage value ACV.

In an example, as illustrated in FIG. 8, a plurality of functions corresponding to the relationship between the frequency of the drive pulse signal of the inverter 82 and the IH power are prepared in advance for different voltage values ACV. FIG. 8 shows three functions according to three different voltage values ACV, but additional functions corresponding to other possible voltage values ACV may be prepared.

The power estimation unit can estimate the IH power based on the frequency FRQ and the voltage value ACV. To do so, the power estimation unit selects a function associated with a particular voltage value ACV from the plurality of prepared functions. The power estimation unit then converts the frequency FRQ into IH power based on the selected function. The power estimation unit acquires (calculates) the IH power based on the frequency FRQ by using the selected function. The calculated IH power is taken as the power estimation result ESTPB.

For example, for a voltage value ACV of 90 V, the power estimation unit selects the F2P90 function (corresponding to the long dash-short dash line in FIG. 8). The power estimation unit then acquires the power estimation result ESTPB based on the frequency FRQ and the F2P90 function. The power estimation result ESTPB acquired based on the F2P90 function will be lower than the power estimation result ESTPB for the same frequency FRQ and the F2P100 function (corresponding to the solid line in FIG. 8). For a voltage value ACV of 110 V, the power estimation unit would select the F2P110 function (corresponding to the dashed line in FIG. 8). The power estimation unit would thus calculate (acquire) the power estimation result ESTPB according to the frequency FRQ and the F2P110 function. The power estimation result ESTPB based on the F2P110 function will be higher than the power estimation result ESTPB based on the F2P100 function at the same frequency FRQ.

In some examples, the power estimation unit may estimate the IH power based on the frequency FRQ and the voltage value ACV by reference to table data instead of by calculation of a value from a function. The table data may include data entries for each voltage value ACV in which a frequency of the drive pulse signal of the inverter 82 and an IH power are associated with each other. The table data may be stored in the memory 25.

In one example, the temperature estimation unit 801 estimates the surface temperature of the fixing belt 77 based on the estimation history PREV and the power estimation result ESTPB, but embodiments are not limited thereto. In other examples, the temperature estimation unit 801 may estimate the surface temperature of the fixing belt 77 based on the estimation history PREV and the power estimation result ESTPA.

In one example, the system controller 13 and the temperature control circuit 14 are illustrated as separate components, but embodiments are not limited thereto. The system controller 13 may include some or all of the functions of the temperature control circuit 14. In such an example, the processor 22 may implement a part or all of the described functions of the temperature control circuit 14 as implemented by the processor 24. The memory 23 may store programs stored in the memory 25, data used in the programs, and the like.

As described above, a temperature control device according to an embodiment includes a temperature estimation unit that estimates a temperature of an object being controlled based on a frequency of a drive signal of an inverter to which an induction heating coil is connected. The temperature control device includes a frequency generation unit that generates the frequency of the drive signal based on the temperature estimation result from the temperature estimation unit, a temperature detection result by a temperature sensor, and a target temperature (setpoint temperature) for the temperature control.

The temperature control device may include a power estimation unit that estimates the power supplied to an induction heating coil based on the frequency of the drive signal. In this example, the temperature estimation unit estimates the temperature of the object being controlled based on the power estimation result from the power estimation unit.

A temperature control device may include a high frequency component extraction unit that extracts high frequency components of the temperature estimation result. The temperature control device may include a calculation unit that calculates a correction temperature value based on the temperature detection result and the high frequency component. The temperature control device may include a temperature comparison unit that compares the target temperature with the correction temperature value. In this example, the frequency generation unit generates the frequency of the drive signal based on the comparison result by the temperature comparison unit.

According to such a configuration, the temperature control device can follow the surface temperature of the object being controlled based on the temperature estimation result even if the temperature sensor has a slow temperature detection response. As a result, the temperature control device can have a lower cost temperature sensor while still preventing overshoot, temperature ripple, and the like from occurring.

A program may be stored in the device at time of shipment of the device after manufacturing, or may be transferred separately from the device. In the latter case, the program may be transferred via a network or may be transferred as stored on a non-transitory, computer-readable recording medium. The recording medium can be any computer-readable medium. The recording medium may be any medium such as a CD-ROM, a memory card, or the like, which can store a program and can be read by a computer, without limited to any form.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A temperature control device, comprising:

a temperature estimation unit configured to estimate a temperature of an object being heated by an induction heating coil, the temperature being estimated based on a frequency of a drive signal supplied to an inverter connected to the induction heating coil;

a frequency generation unit configured to set the frequency of the drive signal based on the temperature estimated by the temperature estimation unit, a detected temperature of the object from a temperature sensor, and a target temperature for the object; and a power estimation unit configured to estimate a power supplied to the induction heating coil based on the frequency of the drive signal, wherein the temperature estimation unit additionally estimates the temperature of the object based on the estimated power supplied to induction heating coil.

2. The temperature control device according to claim 1, wherein the power estimation unit estimates the power supplied to the induction heating coil based on an external AC voltage value.

3. The temperature control device according to claim 1, wherein the temperature estimation unit estimates the temperature of the object using a RC circuit.

4. The temperature control device according to claim 1, further comprising:

a high frequency component extraction unit configured to extract a high-frequency component of the temperature estimated by temperature estimation unit;

a calculation unit configured to calculate a correction temperature value based on the detected temperature and the extracted high frequency component; and a temperature comparison unit configured to compare the target temperature to the correction temperature value.

5. The temperature control device according to claim 4, wherein the frequency generation unit sets the frequency of the drive signal based on the comparison by the temperature comparison unit.

6. The temperature control device according to claim 1, wherein the object is a fixing belt of an image forming apparatus.

7. A fixing device, comprising:
a fixing belt;
a temperature sensor configured to detect a temperature of the fixing belt;
an inductive heater including an induction heating coil configured to heat the fixing belt to a target temperature;
a temperature control device including:
a temperature estimation unit configured to estimate the temperature of the fixing belt being heated by the induction heating coil, the temperature being estimated based on a frequency of a drive signal supplied to an inverter connected to the induction heating coil; and
a frequency generation unit configured to set the frequency of the drive signal based on the temperature estimated by the temperature estimation unit, a detected temperature of the fixing belt from the temperature sensor, and the target temperature for the fixing belt; and
a power estimation unit configured to estimate a power supplied to the induction heating coil based on the frequency of the drive signal, wherein
the temperature estimation unit additionally estimates the temperature of the fixing belt based on the estimated power supplied to induction heating coil.

8. The fixing device according to claim 7, wherein the power estimation unit estimates the power supplied to the induction heating coil based on an external AC voltage value.

9. The fixing device according to claim 7, wherein the temperature estimation unit estimates the temperature of the fixing belt using a RC circuit.

10. The fixing device according to claim 7, further comprising:
a high frequency component extraction unit configured to extract a high-frequency component of the temperature estimated by temperature estimation unit;
a calculation unit configured to calculate a correction temperature value based on the detected temperature and the extracted high frequency component; and
a temperature comparison unit configured to compare the target temperature to the correction temperature value.

11. The fixing device according to claim 10, wherein the frequency generation unit sets the frequency of the drive signal based on the comparison by the temperature comparison unit.

12. An image forming apparatus, comprising:
a power conversion unit configured to receive an external AC voltage;
an image forming unit configured to form a toner image of a sheet;
a fixing device configured to heat the toner image formed on the sheet by the image forming unit, the fixing device including:
a fixing belt to contact the sheet with the toner image formed thereon;
a temperature sensor configured to detect a temperature of the fixing belt;
an inductive heater including an induction heating coil configured to heat the fixing belt to a target temperature;
a temperature control device including:
a temperature estimation unit configured to estimate the temperature of the fixing belt being heated by the induction heating coil, the temperature being estimated based on a frequency of a drive signal supplied to an inverter connected to the induction heating coil; and
a frequency generation unit configured to set the frequency of the drive signal based on the temperature estimated by the temperature estimation unit, a detected temperature of the fixing belt from the temperature sensor, and the target temperature for the fixing belt; and
a power estimation unit configured to estimate a power supplied to the induction heating coil based on the frequency of the drive signal, wherein
the temperature estimation unit additionally estimates the temperature of the fixing belt based on the estimated power supplied to induction heating coil.

13. The image forming apparatus according to claim 12, wherein the power estimation unit estimates the power supplied to the induction heating coil based on the external AC voltage.

14. The image forming apparatus according to claim 12, wherein the temperature estimation unit estimates the temperature of the fixing belt using a RC circuit.

15. The image forming apparatus according to claim 12, further comprising:
a high frequency component extraction unit configured to extract a high-frequency component of the temperature estimated by temperature estimation unit;
a calculation unit configured to calculate a correction temperature value based on the detected temperature and the extracted high frequency component; and
a temperature comparison unit configured to compare the target temperature to the correction temperature value.

16. The image forming apparatus according to claim 15, wherein the frequency generation unit sets the frequency of the drive signal based on the comparison by the temperature comparison unit.

* * * * *